US006602100B2

United States Patent
Tawa et al.

(10) Patent No.: US 6,602,100 B2
(45) Date of Patent: Aug. 5, 2003

(54) PASSAGE WALL COOLING STRUCTURE IN OUTBOARD ENGINE SYSTEM

(75) Inventors: Hiroki Tawa, Wako (JP); Hiroyuki Murata, Wako (JP); Tomonori Ikuma, Wako (JP); Hiroyuki Yoshida, Wako (JP); Hideaki Takada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/754,251

(22) Filed: Jan. 5, 2001

(65) Prior Publication Data

US 2001/0019927 A1 Sep. 6, 2001

(30) Foreign Application Priority Data

Jan. 17, 2000 (JP) ........................................ 2000-010385

(51) Int. Cl.$^7$ ............................................... B63H 21/38
(52) U.S. Cl. ............................................................ 440/88
(58) Field of Search ............................................ 440/88

(56) References Cited

U.S. PATENT DOCUMENTS

| 5,232,387 A | 8/1993 | Sumigawa | |
|---|---|---|---|
| 5,462,464 A | * 10/1995 | Ming | 440/88 |
| 5,733,157 A | 5/1998 | Okuzawa et al. | |
| 5,937,801 A | * 8/1999 | Davis | 123/41.33 |
| 2001/0003692 A1 | * 6/2001 | Nakata | 440/89 |
| 2001/0008818 A1 | * 7/2001 | Tawa et al. | 440/76 |

FOREIGN PATENT DOCUMENTS

| JP | 54-2556 | 2/1979 |
|---|---|---|
| JP | 58-183384 | 10/1983 |

* cited by examiner

Primary Examiner—Sherman Basinger
(74) Attorney, Agent, or Firm—Arent Fox Kintner Plotkin & Kahn, PLLC

(57) ABSTRACT

An outboard engine system includes a case member which is disposed below an engine body and integrally provided with an oil pan opening upwards, and a passage wall extending vertically to define an exhaust gas passage through which an exhaust gas flows. A portion of an outer wall of the case member is formed by the passage wall, and a recess is provided in the outer wall of the case member with a portion of the passage wall facing the recess. The recess is covered with a plate member fixed to the outer wall of the case member, and a cooling water passage, through which cooling water flows, is defined between the plate member and the recess. Thus, the passage wall integral with the oil pan is cooled effectively, while avoiding increases in size and weight.

1 Claim, 14 Drawing Sheets

PASSAGE WALL COOLING STRUCTURE IN OUTBOARD ENGINE SYSTEM

BACKGROUND OF THE INVENTION

1. Field of the Invention

The present invention relates to an improvement of a passage wall cooling structure in an outboard engine system including a case member which is disposed below an engine body and integrally provided with an oil pan opening upwards, and a passage wall extending vertically to define an exhaust gas passage through which an exhaust gas flows, so that the passage wall is cooled to prevent the temperature of the oil pan from being raised by the exhaust gas flowing through the exhaust gas passage.

2. Description of the Related Art

Such a passage wall cooling structure in an outboard engine system is conventionally known from Japanese Utility Model Publication No. 54-2556 and Japanese Patent Application Laid-open No. 58-183384 and the like, for example.

In the system disclosed in the above Japanese Utility Model Publication No. 54-2556, however, a water channel is defined by a recess provided in the outer wall of the case member and a side lid incorporated in the recess, so that a portion of cooling water in the water channel is incorporated into an exhaust gas in the exhaust gas passage. In order to drop the temperature of the passage wall, the amount of cooling water incorporated into the exhaust gas must be increased, and a back flow of a splash of the cooling water due to the pulsation of the exhaust gas must be taken into consideration depending on a position of incorporation of the cooling water, resulting in a troublesome handling.

In the system disclosed in the above Japanese Patent Application Laid-open No. 58-183384, an inner tube portion which is the passage wall defining the exhaust gas passage and an intermediate tube portion surrounding the inner tube portion, are disposed within an outer tube portion forming an outer wall of the oil pan, and the cooling water passage is defined between the inner tube portion and the intermediate tube portion. However, such a structure is produced by molding, but to provide a draft, the area of an opening in one end of each of the outer, inner and intermediate tube portions must be larger than that in the other end. For this reason, a wasteful wall is left to bring about an increase in weight and an increase in size of the case member.

SUMMARY OF THE INVENTION

The present invention has been accomplished with such circumstances in view, and it is an object of the present invention to provide a passage wall cooling structure in an outboard engine system, wherein the passage wall integral with the oil pan can be cooled effectively, while avoiding the increase in size and the increase in weight.

To achieve the above object, according to the present invention, there is provided a passage wall cooling structure in an outboard engine system comprising a case member which is disposed below an engine body and integrally provided with an oil pan opening upwards, and a passage wall extending vertically to define an exhaust gas passage through which an exhaust gas flows, wherein a portion of an outer wall of said case member is formed by the passage wall, the outer wall of the case member being provided with a recess which is covered with a plate member fixed to the outer wall of the case member, with a portion of said passage wall facing said recess, and a cooling water passage, through which cooling water flows, is defined between the plate member and the recess.

With such arrangement, the passage wall can be cooled effectively by the cooling water flowing through the cooling water passage to prevent the rise in temperature of the oil pan. Moreover, a portion of the outer wall of the case member is formed by the passage wall, and the recess is provided in the outer wall of the case member with a portion of the passage wall facing the recess. Therefore, it is unnecessary to take account of a draft provided in the molding for forming the cooling water passage, thereby avoiding increases in size and weight of the case member.

The above and other objects, features and advantages of the invention will become apparent from the following description of the preferred embodiment taken in conjunction with the accompanying drawings.

BRIEF DESCRIPTION OF THE DRAWINGS

FIG. 1 is a side view of the entire outboard engine system;

FIG. 2 is an enlarged vertical sectional view of an essential portion shown in FIG. 1;

FIG. 3 is an enlarged sectional view taken along a line 3—3 in FIG. 2 with an engine cover eliminated;

FIG. 4 is an enlarged sectional view taken along a line 4—4 in FIG. 2 with the engine cover eliminated;

FIG. 5 is an enlarged view of the essential portion shown in FIG. 2;

FIG. 6 is an enlarged sectional view taken along a line 6—6 in FIG. 4;

FIG. 7 is an enlarged sectional view taken along a line 7—7 in FIG. 4;

FIG. 8 is a sectional view taken along a line 8—8 in FIG. 6;

FIG. 9 is a sectional view taken along a line 9—9 in FIG. 6;

FIG. 10 is a cross-sectional view of an oil case, taken along a line 10—10 in FIG. 11;

FIG. 11 is a rear view of the oil case, taken in the direction of an arrow 11 in FIG. 10;

FIG. 12 is a front view of a lid member mounted to a rear surface of the oil case;

FIG. 13 is an enlarged vertical sectional view showing a structure of mounting of an exhaust gas sampling pipe; and FIG. 14 is a sectional view taken along a line 14—14 in FIG. 2 for explaining a structure of fixing of a lower end of an undercover to a casing.

DESCRIPTION OF THE PREFERRED EMBODIMENT

Figure 1:
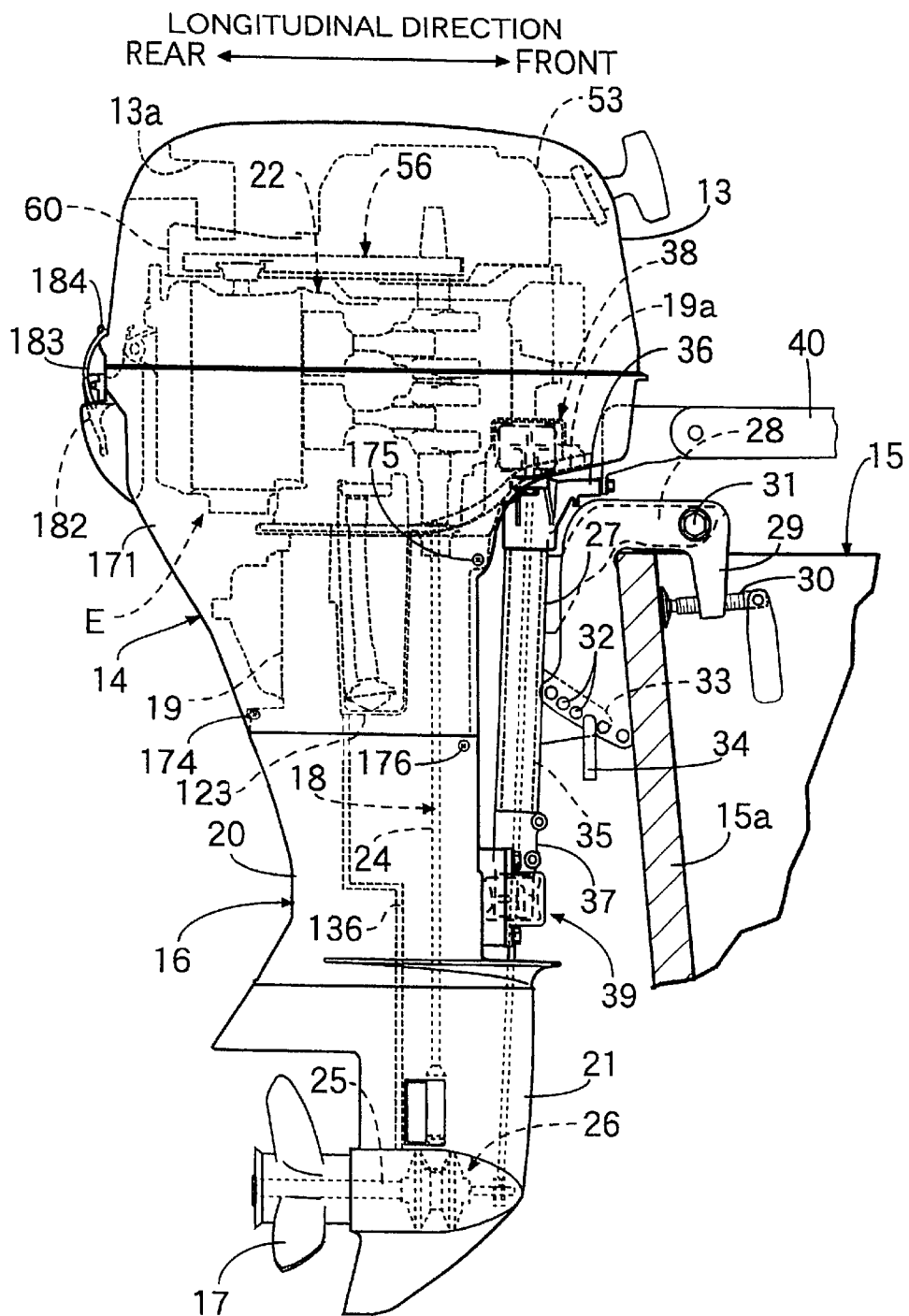
FIGS. 1 to 14 show an embodiment of the present invention.
Figure 2:
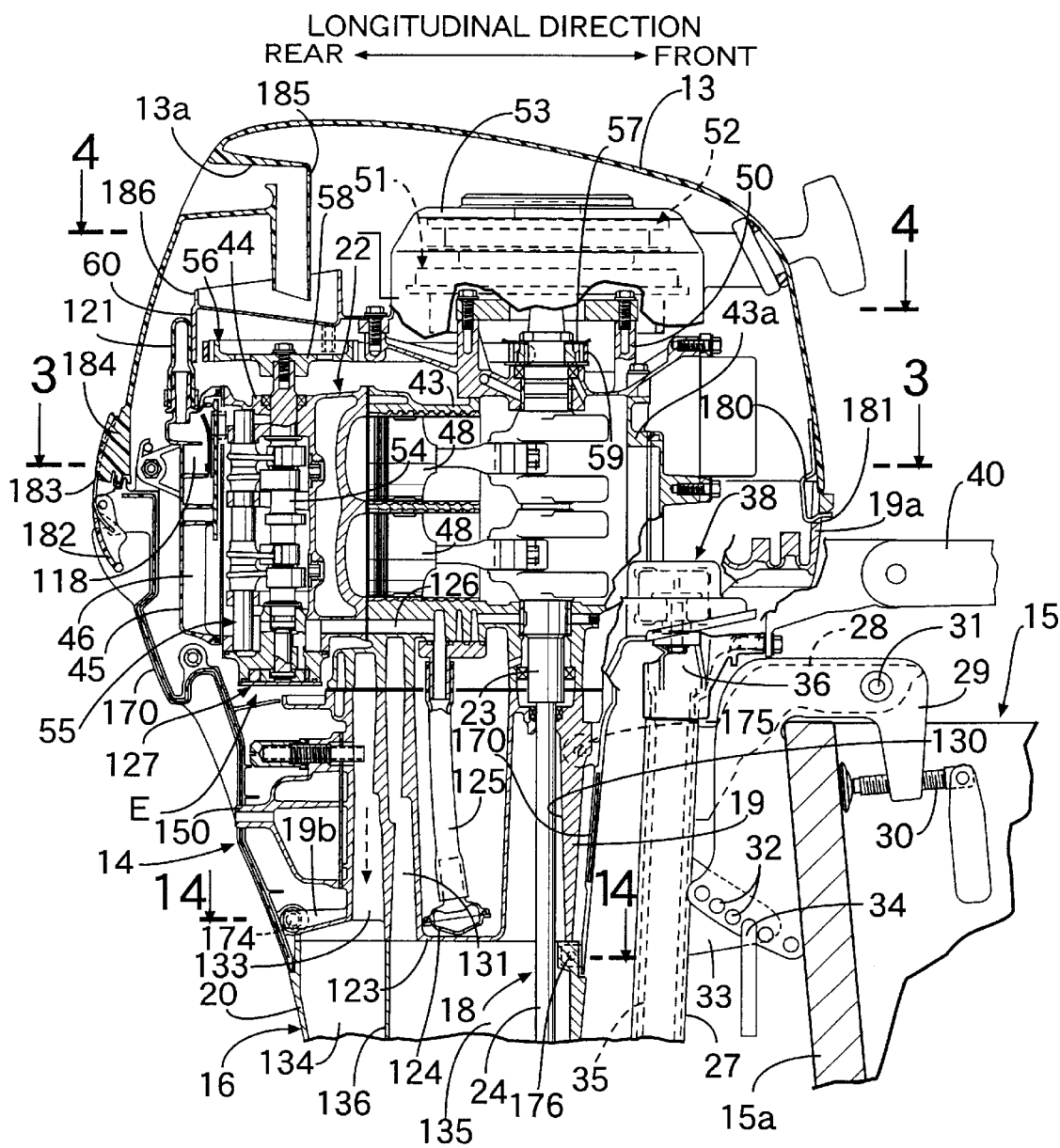

The present invention will be described by way of an embodiment with reference to the accompanying drawings. Referring first to FIGS. 1 and 2, a vertically extending casing 16 is mounted to a stern plate 15a of a hull 15, and a 2-cylinder, 4-cycle engine E, for example, is mounted at an upper end of the casing 16. At least an upper portion of the engine E (upper half, in this embodiment) is covered with an engine cover 13 made of a synthetic resin, and at least a lower portion, e.g., lower half of the engine E in this embodiment and an upper portion of the casing 16 are covered with an undercover 14 made of a synthetic resin. A propeller 17 is rotatably carried at a lower end of the casing 16, so that power from the engine E is transmitted to the propeller 17 through a driving-force transmitting means 18 accommodated in the casing 16.

The casing 16 is comprised of an oil case 19, an extension case 20 coupled to a lower end of the oil case 19, and a gear case 21 coupled to a lower end of the extension case 20. The engine E has an engine body 22, which is coupled to the oil case 19 in such a manner that a crankshaft 23 extends vertically, and the propeller 17 is rotatably carried on the gear case 21.

The driving-force transmitting means 18 comprises a forward and backward movement switchover mechanism 26 mounted between a lower end of a drive shaft 24 connected to the crankshaft 23 and extending vertically within the casing 16 and a rear end of a propeller shaft 25 connected to the propeller 17.

An upwardly and downwardly extending pipe-shaped swivel case 27 is disposed on a front side of the casing 16, i.e., on a side closer to the hull 15, and a swinging arm 28 is provided at an upper portion of the swivel case 27 to extend toward the hull 15. On the other hand, an inversed J-shaped mounting bracket 29 is detachably attached from the above and fixed to the stern plate 15a of the hull 15 by tightening a setscrew 30 threadedly engaged with the mounting bracket 29. The swinging arm 28 is pivotally supported at its front end on the mounting bracket 29 through a pivot 31 having a horizontal axis.

A plurality of pinholes 32 are provided in the mounting bracket 29, so that the tilting angle of the casing 16 and thus the outboard engine system about the axis of the pivot 31 can be regulated by inserting a pin 34 through a pinhole (not shown) defined in a locking plate 33 secured to the swivel case 27 and through any of the pinholes 32 in the mounting bracket 29.

A swivel shaft 35 is inserted through the swivel case 27 and rotatably supported by the swivel case 27. A mount arm 36 is provided at an upper end of the swivel shaft 35, and a mount block 37 is provided at a lower end of the swivel shaft 35.

Figure 3:
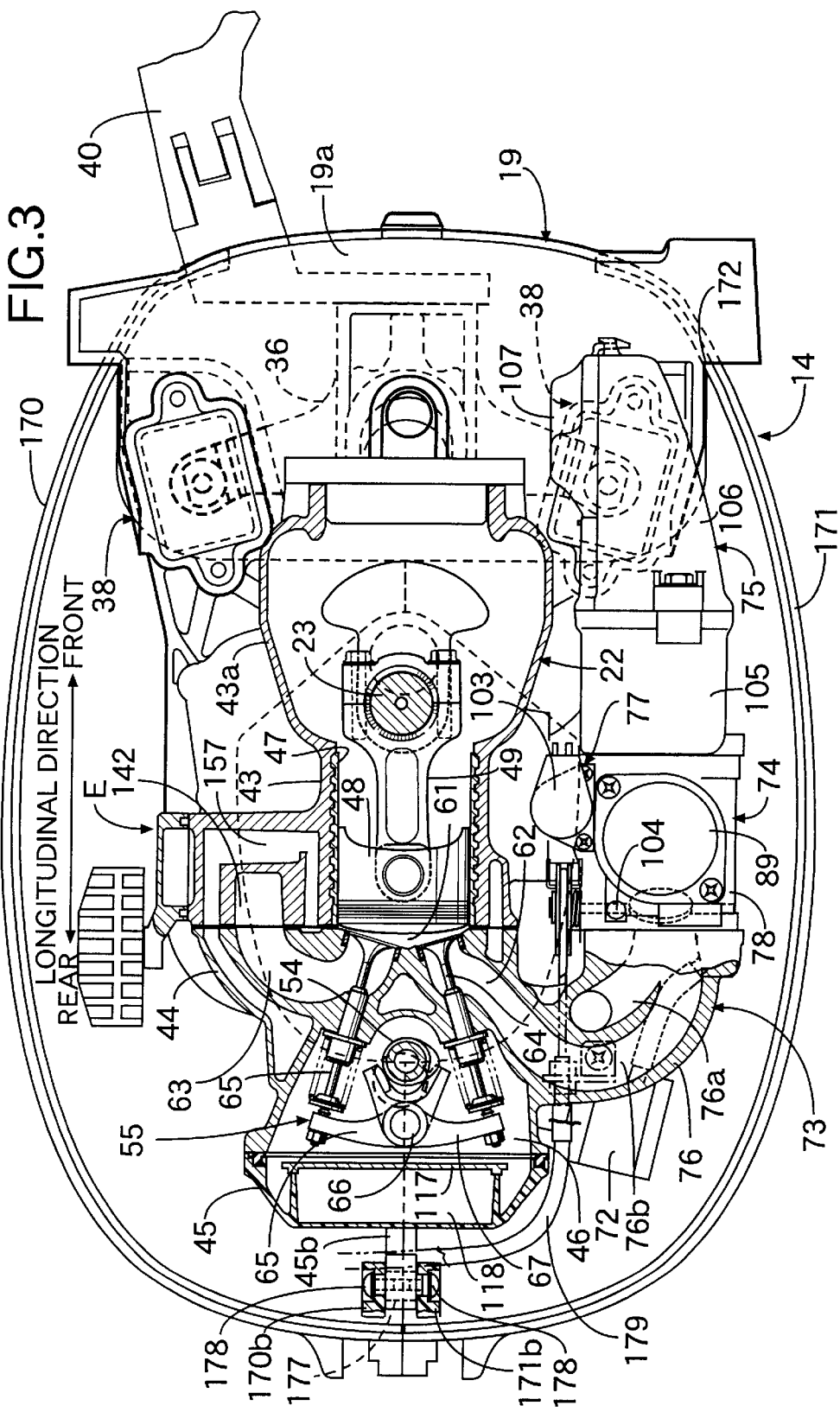

Referring also to FIG. 3, the oil case 19 of the casing 16 is integrally provided at an upper end of its front portion with a support arm 19a disposed above the mount arm 36. The mount arm 36 is resiliently connected to the support arm 19a through a pair of left and right upper mounts 38, 38, and the mount block 37 is resiliently connected to the extension case 20 through a lower mount 39. A steering handlebar 40 is fixed to the mount arm 36 to extend toward the hull 15, so that the casing 16 can be turned laterally about an axis of the swivel shaft 35 by laterally operating the steering handlebar 40 to steer the outboard engine system.

Figure 4:
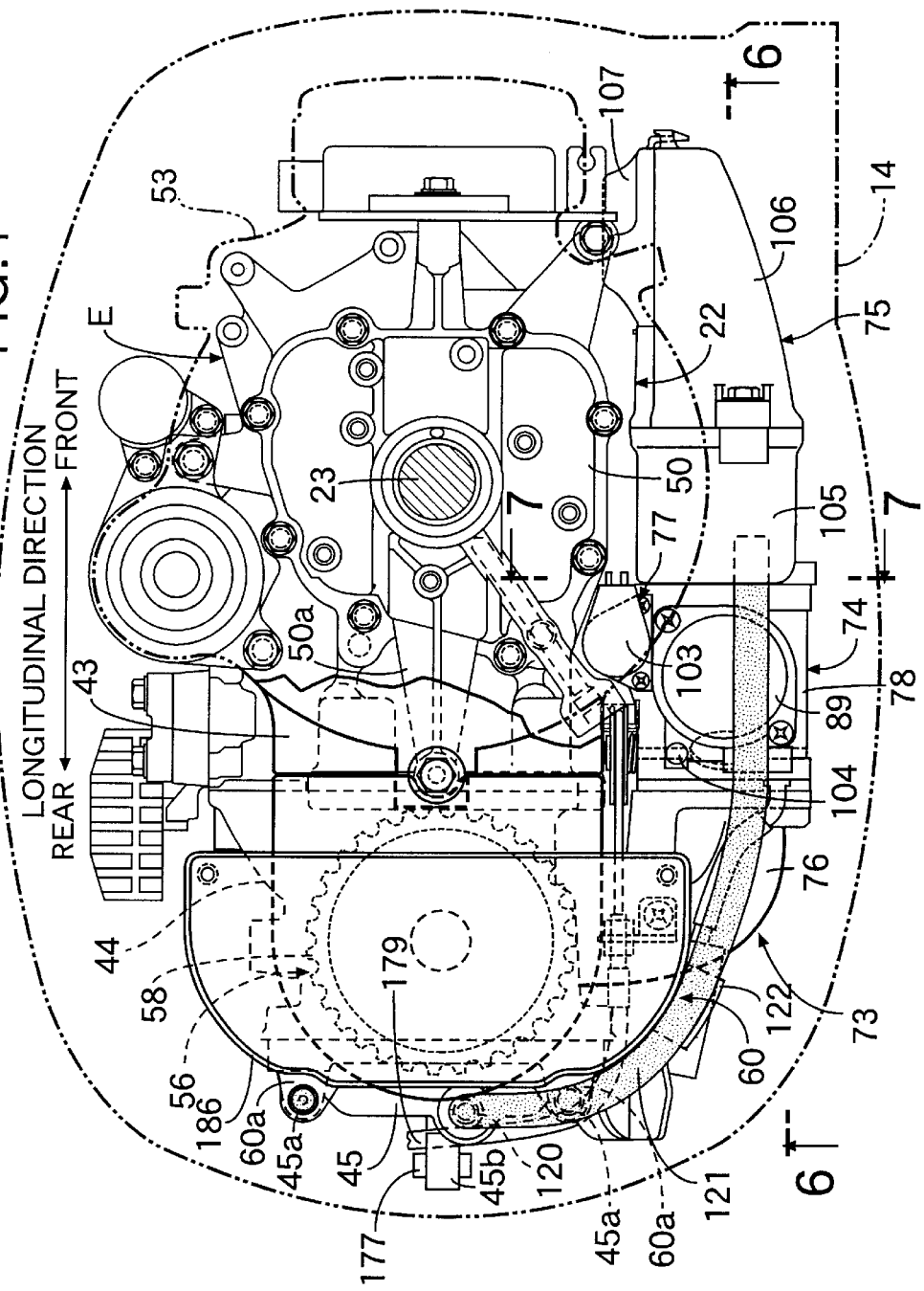
Figure 5:
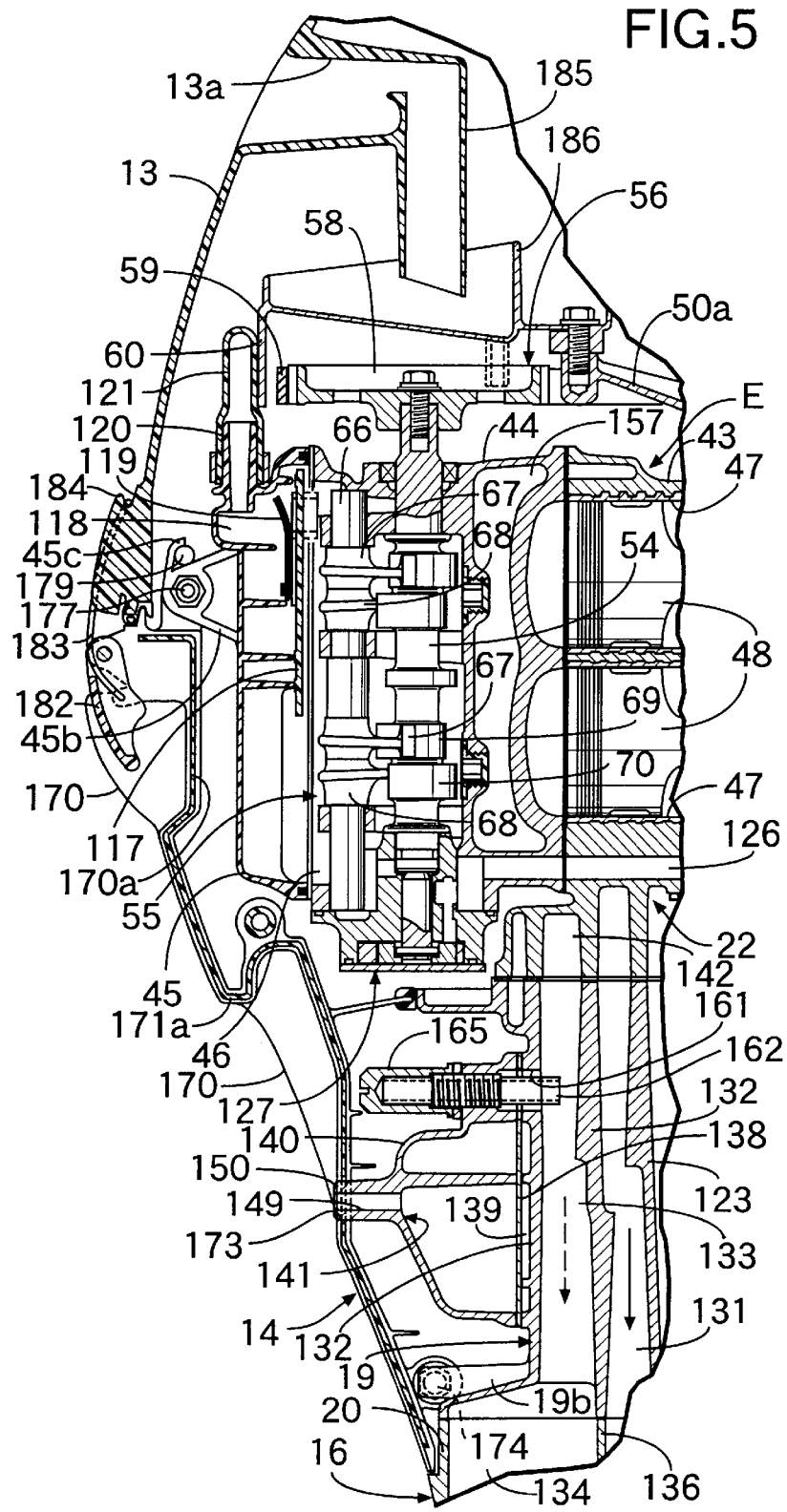

Referring also to FIGS. 4 and 5, the engine body 22 includes an engine block 43 integrally provided with a crankcase 43a and coupled to an upper surface of the oil case 19, a cylinder head 44 coupled to the engine block 43, and a head cover 45 made of a synthetic resin and coupled to the cylinder head 44. A valve operating chamber 46 is defined between the cylinder head 44 and the head cover 45.

A pair of upper end lower cylinder bores 47, 47 are provided in the engine block 43 and each have a cylinder axis extending in a longitudinal direction of the outboard engine system, and pistons 48, 48 are slidably received in the cylinder bores 47, 47, respectively. On the other hand, the crankshaft 23 extending vertically within the crankcase 43a is rotatably supported by a support member 50 coupled to an upper portion of the crankcase 43a and by a lower portion of the crankcase 43a, and the pistons 48, 48 are connected to the crankshaft 23 through connecting rods 49, 49, respectively.

A power generator 51 and a recoiled starter 52 are coaxially connected to an upper end of the crankshaft 23 protruding upwards from the support member 50, and are covered with a common cover 53.

A valve operating mechanism 55 including a camshaft 54 having an axis parallel to the crankshaft 23 is accommodated in the valve operating chamber 46. The camshaft 54 is rotatably supported by the cylinder head 44. Power is transmitted to the camshaft 54 through a belt transmitting means 56, which comprises an endless timing belt 59 wound around a driving pulley 57 fixed to the crankshaft 23 above the support member 50 and a driven pulley 58 fixed to an upper end of the camshaft 54 above the cylinder head 44.

A portion of the belt transmitting means 56 corresponding to the driven pulley 58 is covered with a belt cover 60. More specifically, a side of the belt transmitting means 56 corresponding to the driving pulley 57 is covered with a cover 53, and the belt cover 60 is disposed to cover a portion which cannot be covered with the cover 53. A pair of arms 60a, 60a are integrally provided at a rear portion of the belt cover 60 to protrude rearwards, and pins 45a, 45a integrally provided on the head cover 45 to protrude upwards are fitted into the arms 60a, 60a with elastic members interposed therebetween, whereby the rear portion of the belt cover 60 is positioned and supported on the head cover 45. The support member 50 is integrally provided with a support arm 50a extending toward the belt cover 60, and the belt cover 60 is fastened to the support arm 50a and thus supported at its front portion to the support member 50.

Referring carefully to FIG. 3, a pair of intake ports 62 are provided in a left side of the cylinder head 44 in an attitude to face rearwards of the outboard engine system, and can be connected to combustion chambers 61, which are defined between the engine block 43 and the cylinder head 44 with the pistons 48, 48 facing the combustion chambers 61, respectively. A pair of exhaust ports 63 are provided in a right side of the cylinder head 44 in an attitude to face rearwards of the outboard engine system, and can be connected to the combustion chambers 61.

The valve operating mechanism 55 is operable to open and close a pair of intake valves 64 for switching over the connection and disconnection between the combustion chambers 61 and the intake ports 62 and a pair of exhaust valves 65 for switching over the connection and disconnection between the combustion chambers 61 and the exhaust ports 63. The valve operating mechanism 55 includes the camshaft 54, a rocker shaft 66 supported by the cylinder head 44 and having an axis parallel to the camshaft 54, a pair of intake rocker arms 67 operatively connected to the intake valves 64 and swingably carried on the rocker shaft 66, and a pair of exhaust rocker arms 68 operatively connected to the exhaust valves 65 and swingably carried on the rocker shaft 66.

Referring carefully to FIG. 5, the camshaft 54 is provided with intake cams 69 corresponding to the intake rocker arms 67, and exhaust cams 70 corresponding to the exhaust rocker arms 68, so that the intake valves 64 and the exhaust valves 65 are opened and closed with operational characteristics depending on cam profiles of the cams 69 and 70 by swinging the intake rocker arms 67 and the exhaust rocker arms 68 to follow the cams 69 and 70, respectively.

An intake device 73 is connected to the intake ports 62 in the cylinder head 44 and includes a carburetor 74 disposed on one side of the engine block 43 (i.e., on a left side at an attitude to face rearwards of the outboard engine system) on a side where the intake ports 62 are disposed, an intake silencer box 75 connected to an upstream end of the carburetor 74, and an intake manifold 76 which interconnects the upstream end of the carburetor 74 and the intake ports 62. The intake manifold 76 is formed integrally with the cylinder head 44 and has a pair of intake passages 76a and 76b individually leading to the intake ports 62 and commonly connected to the carburetor 74. The carburetor 74 is formed into a variable Venturi type, particularly, a so-called constant vacuum type utilizing vacuum, and has a bypass-type starting device 77.

Figure 6:
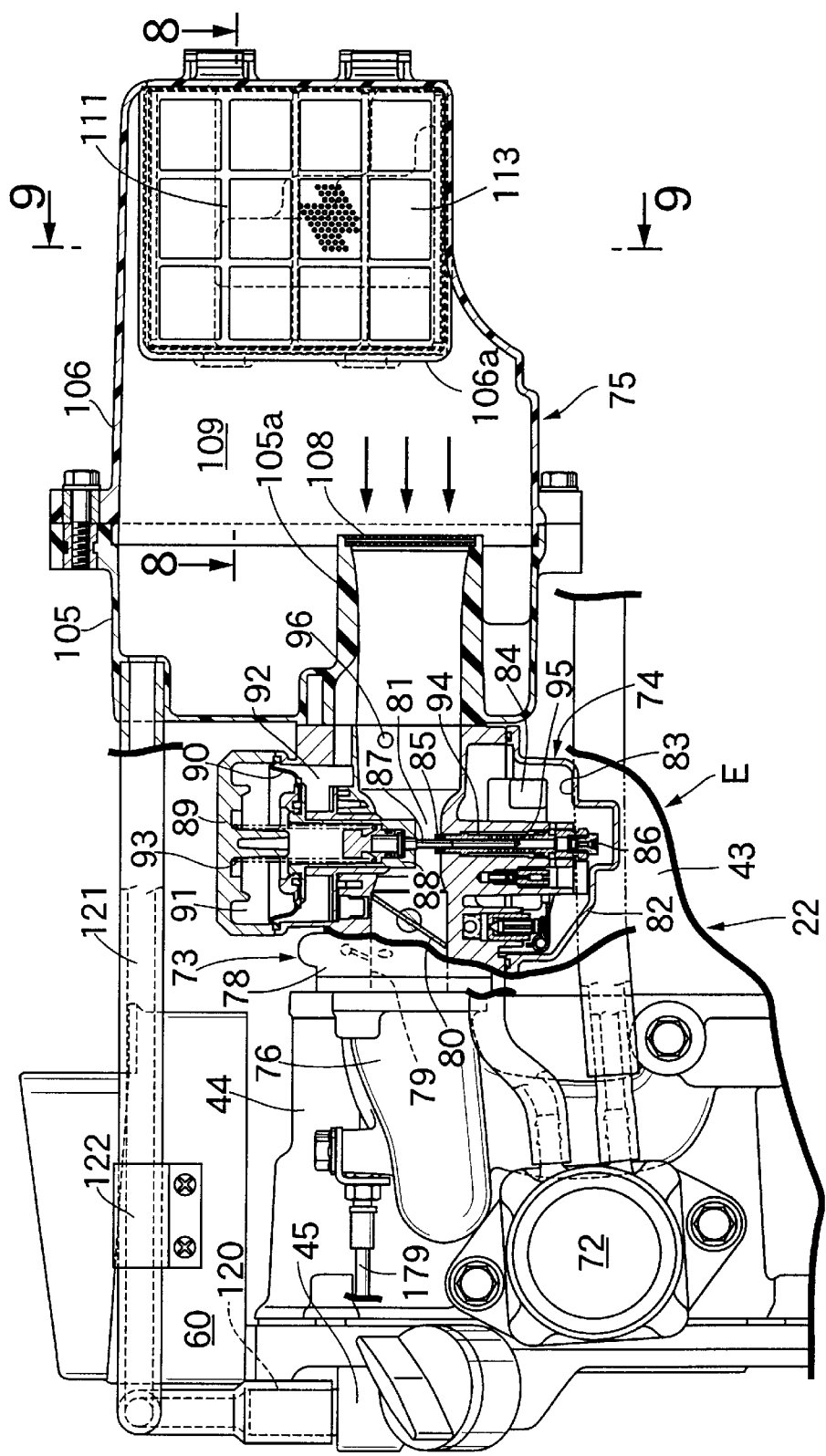

Referring to FIG. 6, the carburetor 74 has a carburetor body 78 which is provided with an intake passageway 79 communicating at its downstream end with the intake manifold 76, and a throttle valve 80 is disposed at a downstream location in the intake passageway 79, and a Venturi portion 81 is disposed in the intake passageway 79 at an intermediate location upstream of the throttle valve 80.

A float chamber member 82 is coupled to the carburetor body 78 immediately below the intake passageway 79, and a float 84 is accommodated in a float chamber 83, which is defined between the carburetor body 78 and the float chamber member 82. A fuel oil can be supplied from a fuel pump 72 mounted to the cylinder head 44 to the float chamber 83.

A fuel nozzle 85 is mounted at a lower portion of the carburetor body 78 and opens into the Venturi portion 81, so that it leads to a portion of the float chamber 83 below a fuel oil surface through a fuel jet 86. A valve needle 87 is inserted into the fuel nozzle 85 from the above to regulate the effective opening area of the fuel nozzle 85. The valve needle 87 is mounted at a lower end of a valve piston 88 liftably supported at an upper portion of the carburetor body 78 to vary the opening area of the Venturi portion 81. The valve piston 88 is connected at its upper end to the central portion of a diaphragm 90, a peripheral edge of which is sandwiched between the carburetor body 78 and a cap 89 mounted at an upper end of the carburetor body 78.

A Venturi pressure chamber 91 is defined between the diaphragm 90 and the cap 89, and an upstream pressure chamber 92 is defined between the diaphragm 90 and the carburetor body 78. The Venturi pressure chamber 91 leads to the Venturi portion 81 through a communication bore (not shown) provided in a lower end of the valve piston 88, and a return spring 93 for biasing the valve piston 88 downwards is accommodated in the Venturi pressure chamber 91. The upstream pressure chamber 92 communicates with the inside of the intake silencer box 75 upstream of the carburetor 74.

An air bleed pipe 94 having a large number of injection bores is connected to a lower portion of the fuel nozzle 85, and an annular chamber 95 is defined between the air bleed pipe 94 and the carburetor body 78 to lead to the upstream pressure chamber 92. An amount of air depending on a difference in pressure between the Venturi portion 81 and the annular chamber 95 is injected from the large number of injection bores into the air bleed pipe 94 to emulsify the fuel in the air bleed pipe 94, thereby promoting the atomization or nebulization of the fuel injected from the fuel nozzle 85 of which effective opening area is regulated by the valve needle 87.

In such carburetor 74, when the amount of air drawn into the intake passageway 79 is increased to a certain value or more, the pressure in the Venturi pressure chamber 91 is dropped along with the pressure in the Venturi portion 81, and a difference in pressure is produced between the Venturi pressure chamber 91 and the upstream pressure chamber 92, whereby the valve piston 88 is pulled up to a position in which a pull-up force of the diaphragm 90 provided by the difference in pressure and a push-down force provided by the return spring 93 are balanced with each other, leading to an increase in opening area of the Venturi portion 81. Thus, the pressure in the Venturi portion 81 is about to return to an original value and hence, after the amount of air drawn has reached the certain value or more, the pressure in the Venturi portion 81 is controlled to a substantially constant value.

Figure 7:
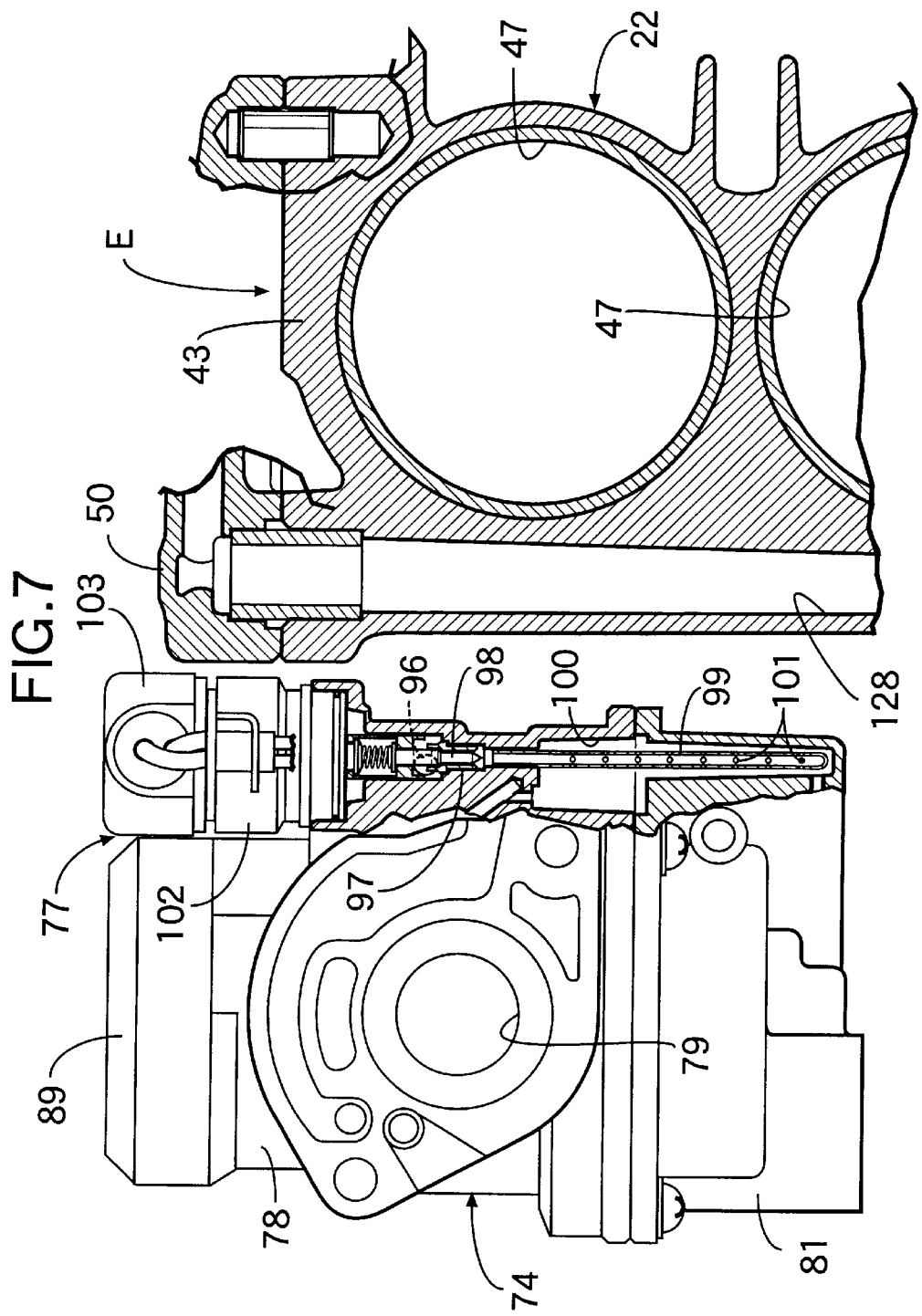

Referring to FIG. 7, the carburetor body 78 is provided with a starting passage 96, which extends around the throttle valve 80 and the Venturi portion 81 and connects the upstream end and lower end of the intake passageway 79. The bypass-type starting device 77 is mounted to the carburetor body 78 to regulate the concentration of a fuel in an air-fuel mixture flowing through the starting passage 96 around the throttle valve 80 and the Venturi portion 81 during starting and warming of the engine E.

The bypass-type starting device 77 includes a starting fuel nozzle 97 mounted on the carburetor body 78 and opening into an intermediate portion of the starting passage 96, a valve needle 98 inserted from the above to regulate the effective opening area of the starting fuel nozzle 97, and a starting air bleed pipe 99 which is inserted into a starting fuel chamber 100 defined between the carburetor body 78 and the float chamber member 82 and which leads to the starting fuel nozzle 97. The starting fuel chamber 100 has a lower end communicating with the float chamber 83, and an upper portion communicating with the upstream air chamber 92, and a large number of through-bores 101 are provided in the starting air bleed pipe 99.

The bypass-type starting device 77 includes a case 102 fastened to the carburetor body 78 and extending upwards. A PTC heater and a wax (not shown) are accommodated in the case 102, so that the valve needle 98 is lifted and lowered to regulate the effective opening area of the starting fuel nozzle 97 by heating and expanding the wax by the PTC heater. A coupler 103 is mounted at an upper end of the case 102 to perform the electric connection with PTC heater.

Such bypass-type starting device 77 is attached to the carburetor body 78 between the intake passageway 79 in the carburetor body 78 of the carburetor 74 and the engine block 43, and the coupler 103 is disposed with its upper surface located at substantially the same level as the upper surface of the cap 89 in the carburetor 74.

Further, another heater 104 such as a PTC heater different from the PTC heater of the bypass-type starting device 77 is embedded in the carburetor body 78, as shown in FIGS. 3 and 4, so that the icing of the carburetor 74 is prevented by the heater 104.

Figure 8:
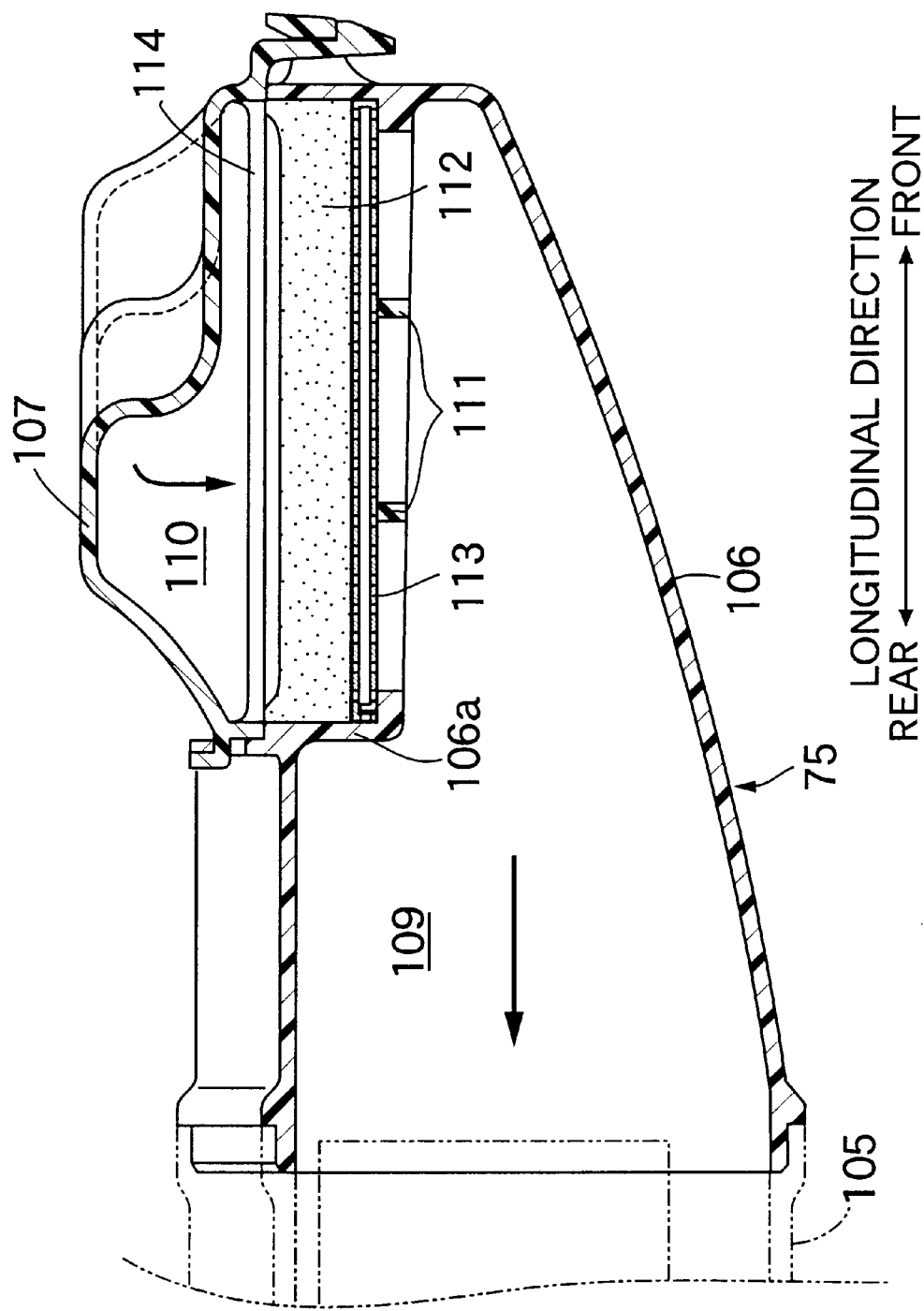
Figure 9:
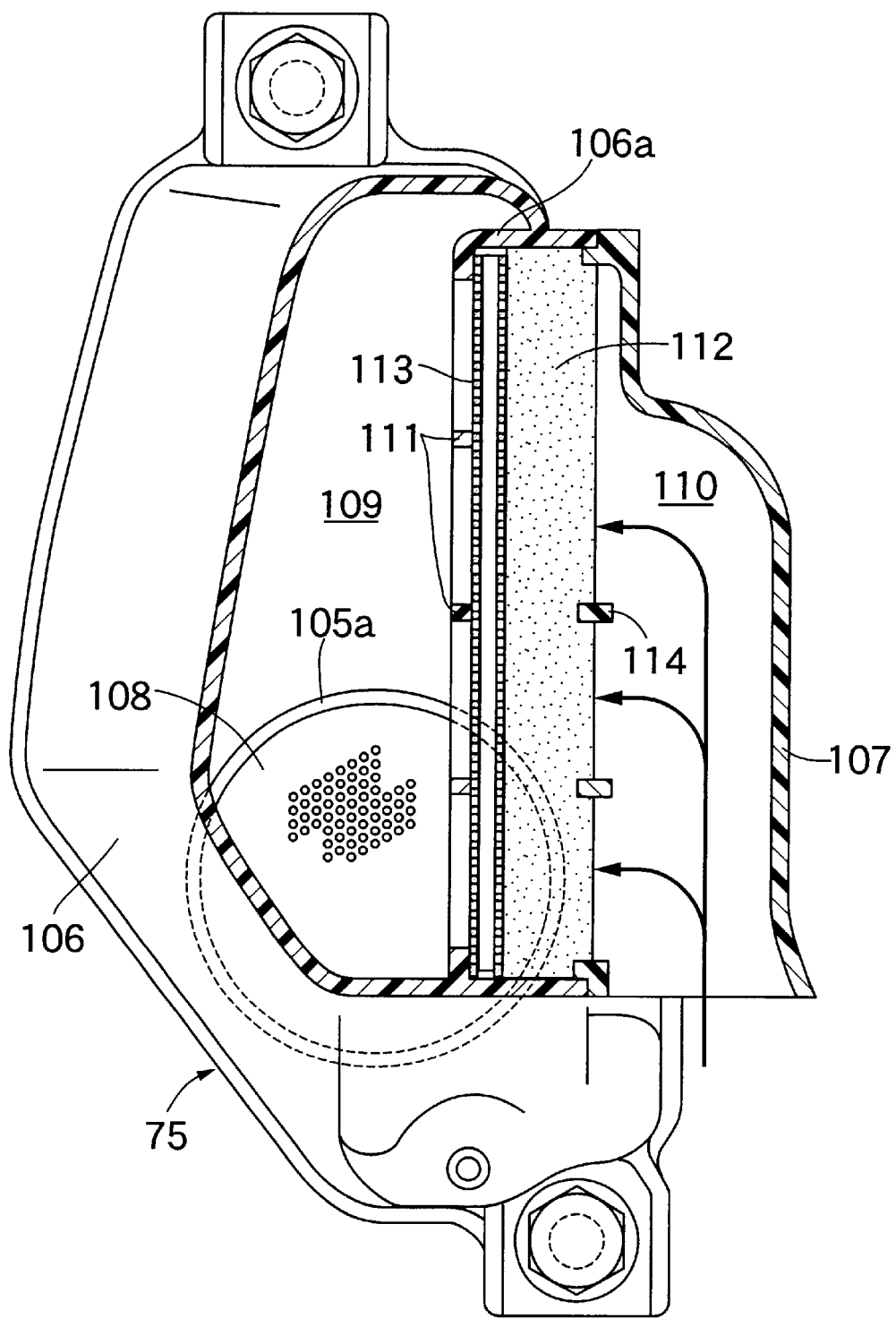

Referring also to FIGS. 8 and 9, the intake silencer box 75 is comprised of a first case member 105 made of a synthetic resin and connected to the upstream end of the carburetor 74, a second case member 106 made of a synthetic resin and detachably connected to the first case member 105, and a third case member 107 made of a synthetic resin and detachably connected to the second case member 106.

The first case member 105 is integrally provided with a connecting tubular portion 105a connected to the upstream end of the intake passageway 79 in the carburetor 74 and extending within the first case member 105. A frame trap 108 having a large number of through-bores is mounted to an inner end, i.e., an upstream end of the connecting tubular portion 105a.

A first air passage 109 is defined between the first and second case members 105 and 106 for guiding air in a direction along the cylinder axis in the engine block 43, i.e., in a direction substantially along the longitudinal direction of the outboard engine system. The first air passage 109 is connected at its downstream end to the carburetor 74 through the frame trap 108 and the connecting tubular portion 105a.

The third case member 107 is detachably connected to an end of the second case member 106 at a longitudinally front side of the outboard engine system, and a second air passage 110 is defined in the third case member 107 to extend vertically with its upstream end, i.e., its lower end being opened to the outside. Moreover, the direction of flowing of air in the second air passage 110 is set so as to be substantially perpendicular to the direction of flowing of air in the first air passage 109 at least at the downstream end, i.e., the upper end, as shown by arrows in FIGS. 8 and 9, and in this embodiment, the direction of flowing of air in the second air passage 110 is set at a lateral direction of the outboard engine system.

A cleaner element 112 is disposed on a plane extending in a vertical direction of the outboard engine system substantially in parallel to the direction of flowing of the air in the first air passage 109, and is accommodated and fixed in the intake silencer box 75 in such a manner that it is interposed between an upstream end of the first air passage 109 and a downstream end of the second air passage 110.

The cleaner element 112 is clamped between the second and third case members 106 and 107, and the second member 106 is integrally provided, at its portion connected to the third case member 107, with a supporting tubular portion 106a of a square cross section. The supporting tubular portion 106a is integrally provided, at its end closer to the first air passage 109, with a lattice portion 111. In addition, the third case member 107 is integrally provided at its downstream end with a plurality of retaining portions 114 extending in the longitudinal direction of the outboard engine system. A frame trap 113 having a large number of through-bores is inserted into the supporting tubular portion 106a in such a manner to abut against the lattice portion 111, and the cleaner element 112 is also inserted into the supporting tubular portion 106a in such a manner that it is sandwiched between the frame trap 113 and the retaining portions 114.

In such intake silencer box 75, the direction of flowing of the air at the downstream end of the second air passage 110 is set at the lateral direction of the outboard engine system, and the second air passage 110 is disposed between the cleaner element 112 disposed on the plane extending substantially in the vertical direction of the outboard engine system and the engine block 43. One of the frame traps 108 and 113 accommodated in the intake silencer box 75, e.g., the frame trap 108, may be omitted.

Referring carefully to FIG. 5, a partition plate 117 is fixed to the head cover 45 within the valve operating chamber 46 to define a breather chamber 118 at a distance from the valve operating chamber 46 between the partition plate 117 and the head cover 45. A reed valve 119 is mounted at a portion of the partition plate 117 facing the breather chamber 118 for permitting the flowing of a breather gas from the valve operating chamber 46 to the breather chamber 118.

A connection pipe 120 leading to the breather chamber 118 is integrally provided in an upward rising attitude at that substantially central portion of the head cover 45 in the lateral direction of the outboard engine system, which is displaced rearwards from the belt cover 60. A breather pipe 121 is connected at one end to the connection pipe 120 and at the other end to the first case member 105 of the intake silencer box 75 to lead to the first air passage 109 in the intake silencer box 75 in the intake device 73.

Moreover, the breather pipe 121 is disposed above the intake manifold 76 and the carburetor 74 to extend along an outer surface of the belt cover 60, and fixed at its intermediate portion to the outer surface of the belt cover 60 by a fixing member 122 fastened to the outer surface of the belt cover 60.

Referring carefully to FIG. 2, the oil case 19 is integrally provided with an oil pan 123, which opens upwards, i.e., toward the engine E, and an oil strainer 124 is mounted at a lower end of a suction pipe 125 inserted into the oil pan 123.

The suction pipe 125 is connected at its upper end to an oil intake passage 126 provided in the engine block 43 and the cylinder head 44. The oil intake passage 126 is connected to an oil pump 127, which is mounted in the cylinder head 44, so that it is driven by the camshaft 54. Thus, the oil discharged from the oil pump 127 is supplied to a crankshaft support portion at a lower portion of the crankcase 43a and to a crankshaft support portion of the support member 50 through an oil supply passage 128 (see FIG. 7) provided in the engine block 43 and the support member 50.

Figure 10:
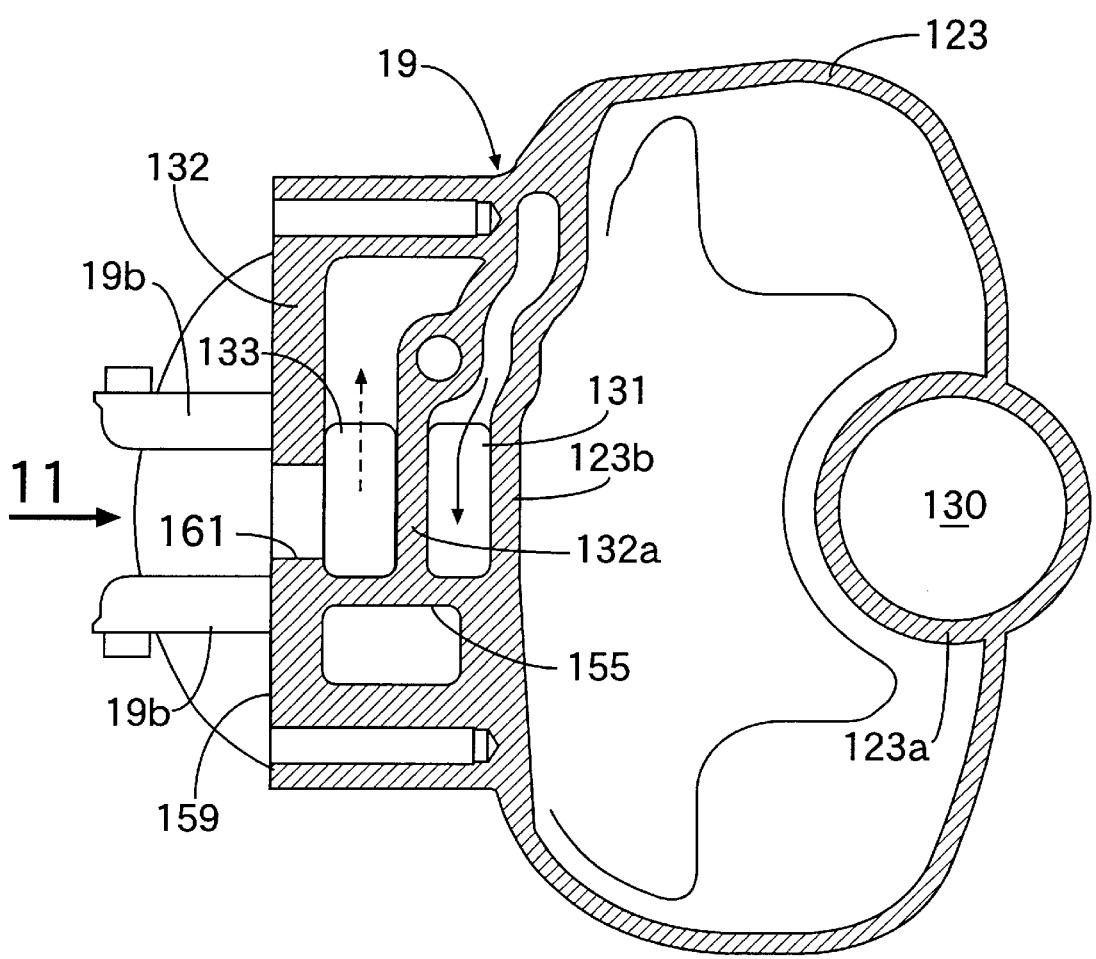

Referring also to FIG. 10, a middle of a front portion of the oil pan 123 is formed as a partition wall 123a curved rearwards, and an upper drive shaft chamber 130 is defined at a front portion of the oil case 19 to extend vertically and isolated from the inside of the oil pan 123 by the partition wall 123a. The drive shaft 24 connected to the crankshaft 23 to extend downwards is inserted into the upper drive shaft chamber 130.

The oil pan 123 has a rear portion formed as a partition wall 123b extending laterally of the outboard engine system, and a first cooling wall passage 131 is defined in the oil case 19 to extend vertically in the rear of the oil pan 123 and isolated from the inside of the oil pan 123 by the partition wall 123b. Further, a passage wall 132 is provided integrally with the oil pan 123 in the rear of the first cooling water passage 131 to form a portion of a rear outer wall of the oil case 19 at its rear portion, and has a partition wall portion 132a by which the passage wall 132 is spaced apart from the first cooling wall passage 131, and a first exhaust gas passage 133 is defined in the passage wall 132 to extend vertically.

The inside of the extension case 20 coupled to the lower end of the oil case 19 is divided by a partition wall 136 into an exhaust gas expansion chamber 134 leading to a lower end of the first exhaust gas passage 133, and a lower drive shaft chamber 135 disposed in front of the exhaust gas expansion chamber 134 to lead to lower ends of the first cooling water passage 131 and the drive shaft chamber 130.

Figure 11:
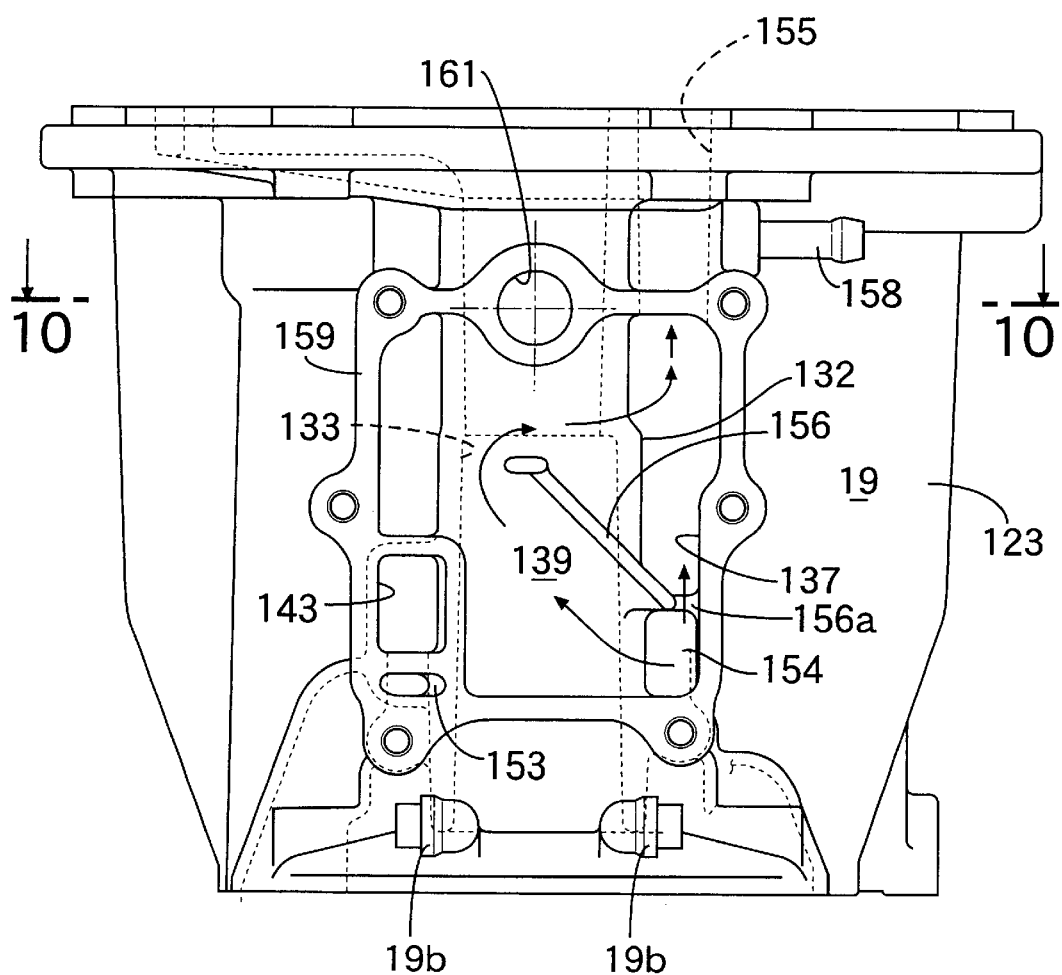

Referring also to FIG. 11, the oil case 19 is provided at an outer wall of its rear portion with a rectangular recess 137 faced by an intermediate portion of a rear portion of the passage wall 132 defining the first exhaust gas passage 133. The recess 137 is covered with a flat plate-shaped member 138, and a second cooling water passage 139 is defined in the recess 137 between the oil case 19 and the plate member 138.

A lid member 140 is fastened to the outer wall of the rear portion of the oil case 19 to sandwich the plate member 138 between the lid member 140 and the oil case 19, and a second exhaust gas passage 141 is defined between the lid member 140 and the plate member 138 and isolated from the second cooling water passage 139. Moreover, the plate member 138 is formed from a material having an elasticity and comes into close contact with a seal face 159 provided on the oil case 19 to surround the recess 137, thereby performing a sealing function.

Thus, an exhaust gas discharged from the exhaust ports 63 in the cylinder head 44 is permitted to flow through a main exhaust gas passage 142 provided in the engine block 44 via the first exhaust gas passage 133 into the exhaust gas expansion chamber 134, and discharged into the external water via a hollow portion around the propeller shaft 25.

On the other hand, the oil case 19 is provided with a passage 143 for turning a portion of the exhaust gas from the upper portion of the exhaust gas expansion chamber 134 toward the second exhaust gas passage 141 to guide it to the second exhaust gas passage 141. The passage 143 communicates to the second exhaust gas passage 141.

Figure 12:
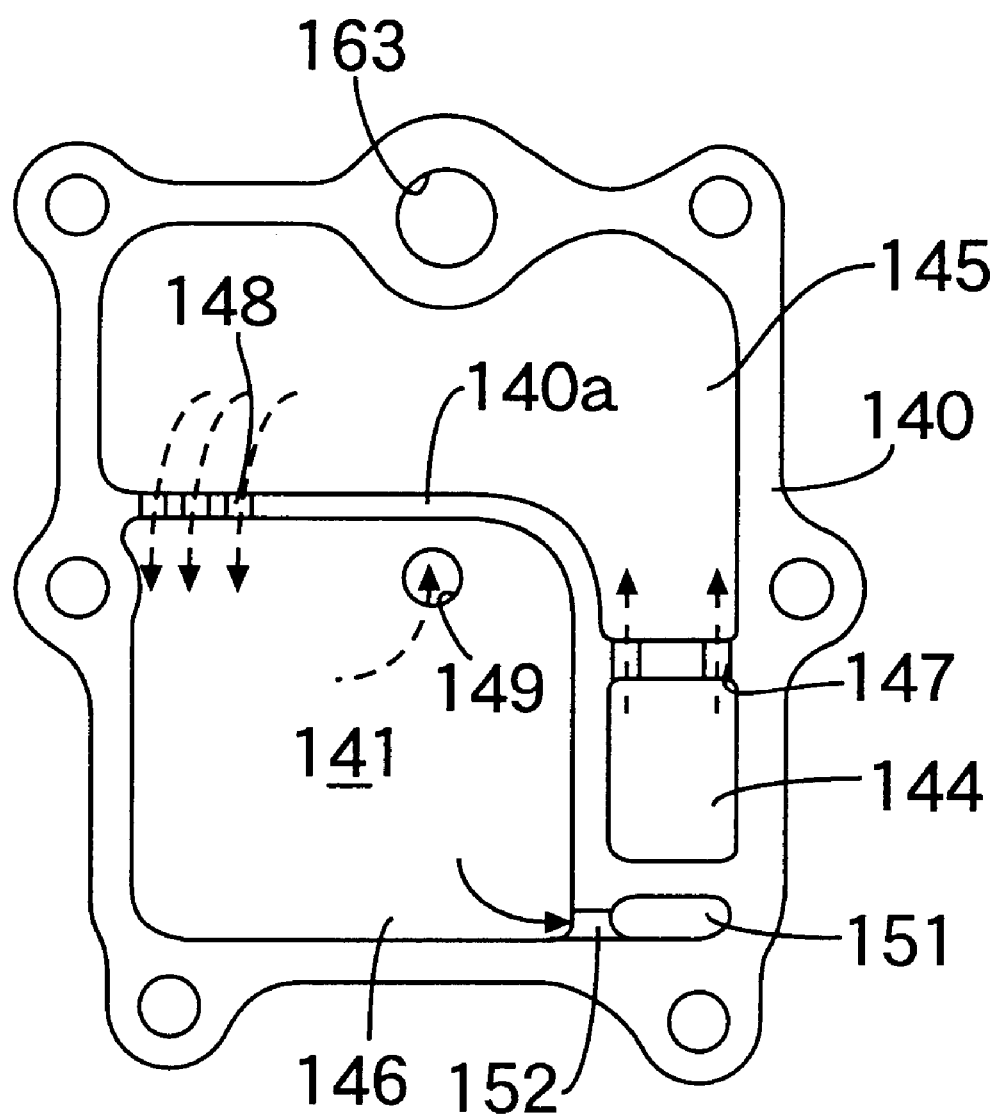

Referring to FIG. 12, the second exhaust gas passage 141 includes a flow-in chamber 144 leading to the passage 143, an upper expansion chamber 145 and a lower expansion chamber 146. The chambers 144, 145 and 146 are partitioned by a wall portion 140a provided on an inner surface of the lid member 149. The flow-in chamber 144 is defined in a lower portion of the lid member 140, and communicates with the upper expansion chamber 145 disposed above the flow-in chamber 144 through flow grooves 147 provided in the wall portion 140a. The upper expansion chamber 145 and the lower expansion chamber 146 disposed below the upper expansion chamber 145 communicate with each other through flow grooves 148 provided in the wall portion 140a. Moreover, the lid member 140 is integrally provided with an exhaust pipe 150, which protrudes rearwards to define a discharge passage 149 leading to an upper portion of the inside of the lower expansion chamber 146, so that a portion of an exhaust gas guided from the upper portion of the exhaust gas expansion chamber 134 to the second exhaust gas passage 141 flows within the second exhaust gas passage 141 and is discharged to the outside through the exhaust pipe 150, as indicated by a broken arrow in FIG. 12.

A return chamber 151 is defined in the lid member 140 below the flow-in chamber 144. Moreover, a return groove 152 is provided in the wall portion 140a for permitting the lower end of the inside of the lower expansion chamber 146 to communicate with the return chamber 151, so that water separated from the exhaust gas in the lower expansion chamber 136 and accumulated in the lower expansion chamber 146 is permitted to flow through the return groove 152 into the return chamber 151. Further, a return passage 153 is provided in the oil case 19 for permitting the return chamber 151 to lead to the exhaust gas expansion chamber 134, so that the water separated from the exhaust gas in the lower expansion chamber 146 is returned to the exhaust gas expansion chamber 134.

On the other hand, cooling water pumped by a cooling water pump (not shown) is supplied through a cooling water inlet 154 provided in the oil case 19 to a lower portion within the second cooling water passage 139 and flows upwards within the second cooling water passage 139 and to a third cooling water passage 155 provided in the oil case 19 at a location above the cooling water inlet 154. In this case, a baffle plate 156 is provided in the oil case 19 for allowing the cooling water to flow in a zigzag manner, as indicated by an arrow in FIG. 11 to prevent the cooling water from flowing in the second cooling water passage 139 from the cooling water inlet 154 directly toward the third cooling water passage 155. Thus, the cooling water can be permitted to flow all over along that portion of the passage wall 132 defining the first exhaust gas passage 133, which faces the second cooling water passage 139. Moreover, a communication groove 156a is provided in a lower end of the baffle plate 156. When the cooling water pump is in operation, a portion of the cooling water from the cooling water inlet 154 flows upwards from the communication groove 156a toward the inside of the second cooling water passage 139, as indicated by the arrow in FIG. 11, but when the cooling water pump is in stoppage, the cooling water can be returned from the second cooling water passage 139 via the communication groove 156a to the cooling water inlet 154, thereby avoiding that the water is accumulated above the baffle plate 156.

The cooling water flowing to the third cooling water passage 155 is introduced into a water jacket 157 (see FIGS. 3 and 5) provided in the engine block 43 and the cylinder head 44, and the cooling water discharged from the water jacket 157 flows down in the first cooling water passage 131 into the lower drive shaft chamber 135. A water-examining withdrawal pipe 158 is mounted to the oil case 19 to lead to an intermediate portion of the third cooling water passage 155.

Figure 13:
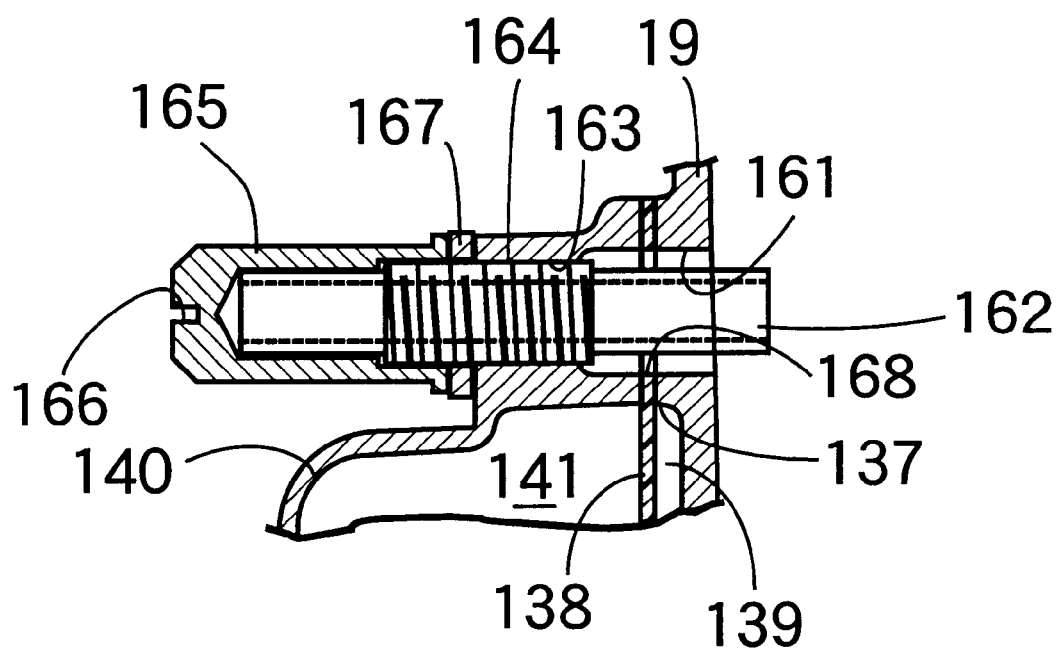

Referring also to FIG. 13, the oil case 19 is provided in its outer wall with an insertion bore 161 whose outer end opens into an upper portion of the seal surface 159 surrounding the recess 137, and whose inner end opens into the first exhaust gas passage 133. An exhaust gas sampling pipe 162 for sampling the exhaust gas is inserted at its inner end through the insertion bore 161 into the first exhaust gas passage 133. The exhaust gas sampling pipe 162 is mounted to extend through the lid member 140 and is fixed air-tightly to the lid member 140 by threadedly fitting an external threaded section 164 provided on an outer surface of an intermediate portion of the exhaust gas sampling pipe 162 into a threaded bore 163 provided in the lid member 140 in correspondence to the insertion bore 161.

A portion of the external threaded section 164 protrudes outwards from the lid member 140, a bottomed cylindrical plug 165 is threadedly fitted over external threaded section 164 at its portion protruding from the lid member 140 to cover an outer end of the exhaust gas sampling pipe 162. The plug 165 has an engage groove 166 provided in its outer surface at a closed end for engagement by a rotating tool such a screwdriver or the like, and a washer 167 is clamped between an open end of the plug 165 and the outer surface of the lid member 140.

The plate member 138 is provided with a through-bore 168 corresponding to an outer end of the insertion bore 161, and the periphery of the outer end of the insertion bore 161 is sealed by the flat plate member 138.

Figure 14:
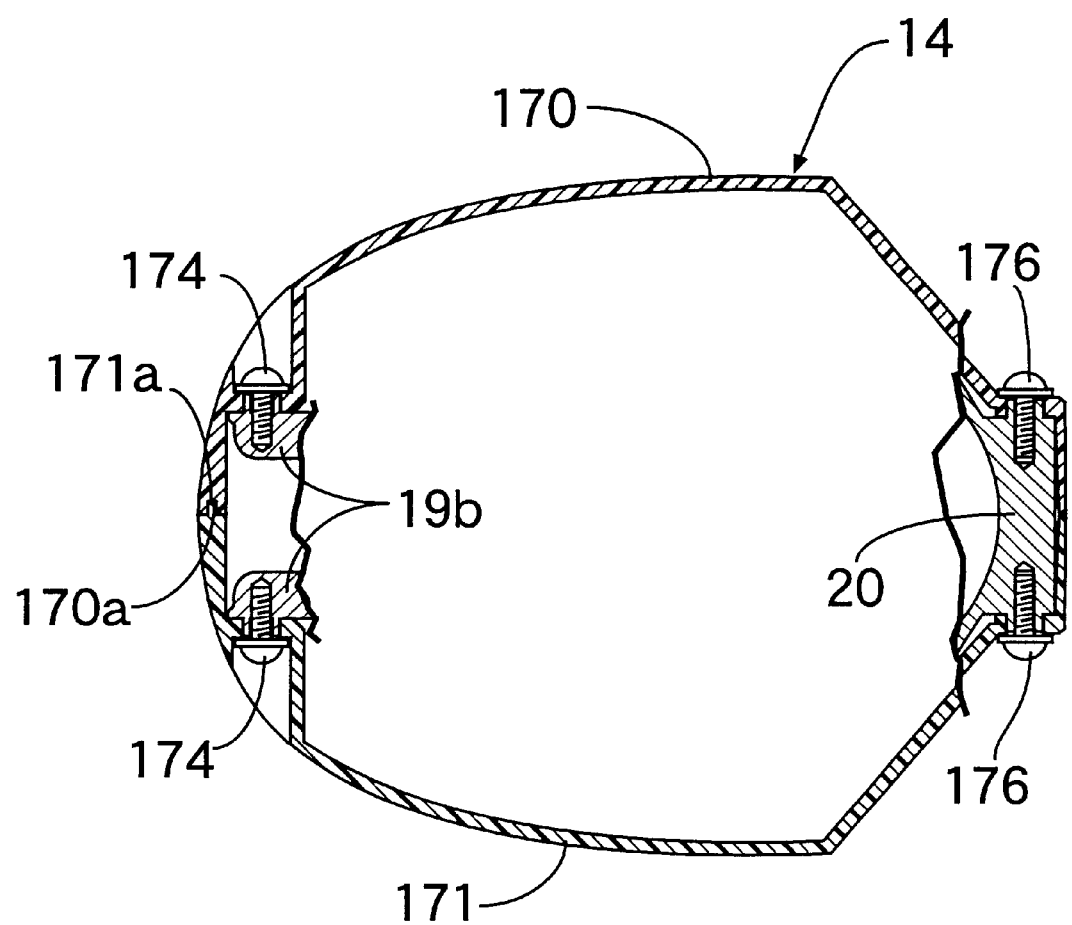

Referring also to FIG. 14, the undercover 14 comprises a pair of cover halves 170 and 171 made of a synthetic resin connected to each other to cover lower half of the engine E and an upper portion of the casing 16 from opposite sides. One of the cover halves 170 has a fitting groove 170a provided in its joint surface to the other half 171, and the other half 171 has a fitting projection 171a provided on its joint surface to the one cover half 170 and fitted into the fitting groove 170a.

A notch 172 is provided at an upper end of a front portion of the undercover 14, as shown in FIG. 3, and the support arm 19a provided on the oil case 19 is disposed in the notch 172, so that its front end is exposed to the outside.

A through-bore 173 is provided in a portion corresponding to the exhaust pipe 150 in the rear portion of the undercover 14 with the rear end of the exhaust pipe 150 being permitted to protrude in order to discharge the exhaust gas from the exhaust passage 149 in the exhaust pipe 150 rearwards of the undercover 14.

The undercover 14 is fixed to the upper portion of the casing 16, and the cover halves 170 and 171 are fastened at their rear portions to a pair of mounting bosses 19b, 19b projectingly provided at the lower portion of the outer wall of the rear portion of the oil case 19 which is an upper portion of the casing 16, by screw members 174, 174, respectively. Additionally, the cover halves 170 and 171 are fastened at their front portions to the upper portion of the front portion of the oil case 19 by screw members 175, respectively, and also fastened at their front portions to the upper end of the front portion of the extension case 20 by screw members 176, respectively. Thus, the undercover 14 is fixed to the oil case 19 which is the upper portion of the casing 16, as well as to the upper end of the extension case 20.

An support projection 45b is provided centrally at the rear portion of the head cover 45 forming a portion of the engine body 22 to protruding rearwards, and a fitment 177 is embedded in the rear end of the support projection 45b and has a threaded bore with opposite ends opened. On the other hand, the cover halves 170 and 171 forming the undercover 14 are integrally provided in their upper areas with portions to be mounted 170b and 171b, which sandwich the support projection 45b from opposite sides. The portions to be mounted 170b and 171b are fastened to the support projection 45b by screw members 178, 178 threadedly fitted in the fitment 177. Thus, the undercover 14 is detachably fixed at its upper portion to the head cover 45 which is a portion of the engine body 22.

An inverted J-shaped arm 45c is integrally connected to the rear end of the support projection 45b to extend upwards from the support projection 45b, and a throttle cable 179 for operating the throttle valve 80 of the carburetor 74 is retained at its intermediate portion between the support projection 45b and the arm 45c.

The engine cover 13 is formed from a synthetic resin into a dish shape covering upper half of the engine E, and a hook 180 is fixed to the engine cover 13 in the front portion of the outboard engine system and engaged from the rear side into an engage bore 181 provided in the front end of the support arm 19a of the oil case 19. A hook lever 182 is pivotally carried at the upper portion of the undercover 14 in the rear portion of the outboard engine system for turning movement about a horizontal axis, and a hook 183 mounted on the hook lever 182 is engaged into an engage portion 184 provided at the rear portion of the engine cover 13. Thus, the undercover 14 is detachably connected at its upper end to the lower end of the engine cover 13.

A tilting-up grip portion 13a is provided at the upper portion of the engine cover 13 in the rear portion of the outboard engine system in such a manner to become recessed forwards, and an air introducing pipe 185 leading to an inner end of the grip portion 13a is integrally provided in the engine cover 13 to introduce air into the engine cover 13. Moreover, the air introducing pipe 185 extends vertically immediately above the belt cover 60 with its lower end opened, and a dish-shaped portion 186 with its upper surface opened is integrally provided at the upper portion of the belt cover 60 to surround the lower end of the air introducing pipe 185 in order to avoid that water entering the belt cover 60 from the air introducing pipe 185 collides with the upper surface of the belt cover 60 to become scattered.

The operation of this embodiment will be described below. The undercover 14 fixed to the upper portion of the casing 16 is detachably fixed at its upper portion to the head cover 45 of the engine body 22, and the engine cover 13 is detachably connected at its lower end to the upper end of the undercover 14. Therefore, the upper portion of the undercover 14 is firmly supported on the engine body 22, and the lower portion of the engine cover 13 is firmly supported on the engine body 22 through the upper portion of the undercover 14. Thus, when an operator has grasped the grip portion 13a provided at the upper portion of the engine cover 13 to conduct the tilting-up operation, the deformation of the lower portion of the engine cover 13 and the upper portion of the undercover 14 can be suppressed to the minimum and hence, the impression of rigidity of the engine cover 13 and the undercover 14 can be obtained.

The breather pipe 121 leading to the breather chamber 118 within the head cover 45 in the engine E and connected at one end to the upper end of the head cover 45 is connected at the other end to the intake silencer box 75 of the intake device 73 disposed on one side of the engine block 43. The breather pipe 121 is disposed along the outer surface of the belt cover 60 disposed above the cylinder head 44 to cover at least that portion of the belt transmitting means 56 interconnecting the camshaft 54 and the crankshaft 23, which corresponds to the driven pulley 58, and is fixed at its intermediate portion to the belt cover 60 by the fixing member 122. Therefore, the breather pipe 121 can be disposed in proximity to the belt cover 60 to such an extent that it is in contact with the belt cover 60, but cannot overhang sideways from the intake device 73. Even if the engine cover 13 covering the upper half of the engine E is relatively small, the breather pipe 121 can be disposed compactly within the engine cover 13.

The carburetor 74 of the intake device 73 is formed into the variable Venturi type, particularly, to the so-called constant vacuum type utilizing vacuum, so that the area of the opening in the Venturi portion 81 in the intake passageway 79 can be varied depending on the operational state of the engine E, thereby achieving both of low-speed and high-speed performances and at the same time, enhancing the accuracy of the air-fuel ratio and providing a reduction in fuel consumption and an enhancement in nature of the exhaust gas.

Moreover, the bypass-type starting device 77 is mounted to the carburetor body 78 of the carburetor 74 between the intake passageway 79 and the engine block 43. Therefore, the bypass-type starting device 77 cannot overhang outwards from the carburetor body 78, thereby avoiding an increase in size of the engine cover 13 in order to avoid any interference with the bypass-type starting device 77.

Further, defined in the intake silencer box 75 disposed at the upstream end of the intake device 73 are the first air passage 109 connected at its downstream end to the carburetor 74 for guiding the air in the direction substantially along the cylinder axis of the engine block 43 extending in the longitudinal direction of the outboard engine system, and the second air passage 110 provided with its upstream end opened to the outside, so that the direction of flowing of the air at least in its downstream end is substantially perpendicular to the direction of flowing of the air in the first air passage 109. The cleaner element 112, which is disposed on the plane substantially in parallel to the direction of flowing of the air in the first air passage 109 and interposed between the upstream end of the first air passage 109 and the downstream end of the second air passage 110, is accommodated and fixed in the intake silencer box 75.

Therefore, the air is purified in the cleaner element 112 while flowing from the second air passage 110 to the first air passage 109. Moreover, the first air passage 109 is provided, so that the air flows therethrough in the direction substantially along the cylinder axis of the engine block 43, i.e., in the substantially longitudinal direction of the outboard engine system, and the cleaner element 112 is disposed in the plane substantially in parallel to the direction of flowing of the air in the first air passage 109. Therefore, the size of the intake silencer box 75 cannot be increased in the lateral direction of the outboard engine system due to the disposition of the cleaner element 112, and it is possible for the intake device 73 to have an air purifying function, while avoiding an increase in size of the intake device 73.

The direction of flowing of the air in the downstream end of the second air passage 110 is set in the lateral direction of the outboard engine system, and the second air passage 110 is disposed between the engine block 43 and the cleaner element 112 disposed on the plane extending substantially vertically of the outboard engine system. Therefore, the opening at the upstream end of the intake silencer box 75 can be disposed at the location where the opening is covered with the intake silencer box 75 itself, thereby preventing, to the utmost, the water entering the engine cover 13 and the undercover 14 covering the engine E from being drawn into the intake device 73.

The recess 137 and the seal surface 159 surrounding the recess 137 are provided on the outer wall of the oil case 19 integrally provided with the passage wall 132 defining the first exhaust gas passage 133 for guiding the exhaust gas from the engine E. The second cooling water passage 139 isolated from the first exhaust gas passage 133 and the second exhaust gas passage 141 are defined between the recess 137 and the lid member 140 mounted to the outer wall of the oil case 19 with the plate member 138 interposed between the lid member 140 and the seal surface 159, and the exhaust gas sampling pipe 162 is inserted into the first exhaust gas passage 133 through the insertion bore 161 provided in the oil case 19 to open into the seal surface 159. Moreover, the plate member 138 performing the sealing function is formed to surround the opening at the outer end of the insertion bore 161, and the exhaust gas sampling pipe 162 is provided to extend through the lid member 140 and air-tightly fixed to the lid member 140.

Therefore, the lid member 140 may have a space enough to ensure that the exhaust gas sampling pipe 162 is passed through the lid member 140. Thus, the exhaust gas sampling pipe 162 can be inserted into the first exhaust gas passage 133, while avoiding an increase in size of the lid member 140, and the oil case 19 and the lid member 140 can be reliably sealed from each other around the exhaust gas sampling pipe 162.

Moreover, a portion of the outer wall of the oil case 19 is formed by the passage wall 132, and the recess 137 provided on the outer wall of the oil case 19 with a portion of the passage wall 132 facing the recess 137 is covered with the plate member 138, and the second cooling water passage 139 is defined between the plate member 138 and the recess 137. Therefore, the passage wall 132 can be cooled effectively by the cooling water flowing through the second cooling water passage 137 to prevent the rising of the temperature of the oil pan 123 integral with the passage wall 132, and it is unnecessary to take account of a draft in the molding for forming the second cooling water passage 137, thereby avoiding increases in size and weight of the oil case 19.

Although the embodiment of the present invention has been described in detail, it will be understood that the present invention is not limited to the above-described embodiment, and various modifications in design may be made without departing from the spirit and scope of the invention defined in claim.

What is claimed is:

1. A passage wall cooling structure in an outboard engine system comprising:
   a case member, which is disposed below an engine body and integrally provided with an oil pan opening upwards; and
   a passage wall that extends vertically to define an exhaust gas passage through which an exhaust gas flows
   wherein an outer surface of said passage wall of said case member is provided with a recess which is covered with a plate member fixed to the outer surface of said passage wall of said case member, with a portion of said passage wall facing said recess,
   wherein said plate member is parallel relative to said exhaust gas passage, and
   wherein a cooling water passage, through which cooling water flows, is defined between said plate member and said recess.

* * * * *